United States Patent [19]

Brown

[11] 4,088,103

[45] May 9, 1978

[54] ATOMIZING DEVICE

[75] Inventor: Peter John Raymond Brown, Bromley, England

[73] Assignee: Piper F.M. Limited, Ashford, England

[21] Appl. No.: 654,285

[22] Filed: Feb. 2, 1976

[30] Foreign Application Priority Data

Feb. 6, 1975 United Kingdom ............... 5190/75

[51] Int. Cl.² .......................................... F02M 29/00
[52] U.S. Cl. ................................ 123/141; 48/180 R; 261/78 R
[58] Field of Search ..................... 123/141; 48/180 R; 261/78 R

[56] References Cited

U.S. PATENT DOCUMENTS

| | | | |
|---|---|---|---|
| 1,315,758 | 9/1919 | Brown | 123/141 |
| 1,340,062 | 5/1920 | Lapham | 123/141 |
| 1,353,248 | 9/1920 | Lapham | 123/141 |
| 1,460,470 | 7/1923 | Askins | 123/141 |
| 1,523,524 | 1/1925 | Harvey | 123/141 |
| 1,770,645 | 7/1930 | Heaton | 123/141 |
| 1,798,492 | 3/1931 | Plowde | 123/141 |
| 1,973,889 | 9/1934 | Timian | 123/141 |
| 2,033,753 | 3/1936 | Bucklen | 123/141 X |
| 2,560,220 | 7/1951 | Graziano | 123/141 |

Primary Examiner—Charles J. Myhre
Assistant Examiner—Ira S. Lazarus
Attorney, Agent, or Firm—Haseltine, Lake & Waters

[57] ABSTRACT

A petrol, internal combustion engine has, at transitions between an inlet manifold and inlet ports of a cylinder head, respective relatively rigid permeable disintegrators which re-atomize the petrol particles passing through them en route to the cylinders. Each disintegrator presents to the approaching mixture an exposed area covered with sharp-edged small holes extending through the disintegrator. Each disintegrator is made by plating a reticulated polyurethane foam with nickel-chrome alloy and then removing the plastics by heating in a vacuum furnace.

7 Claims, 1 Drawing Figure

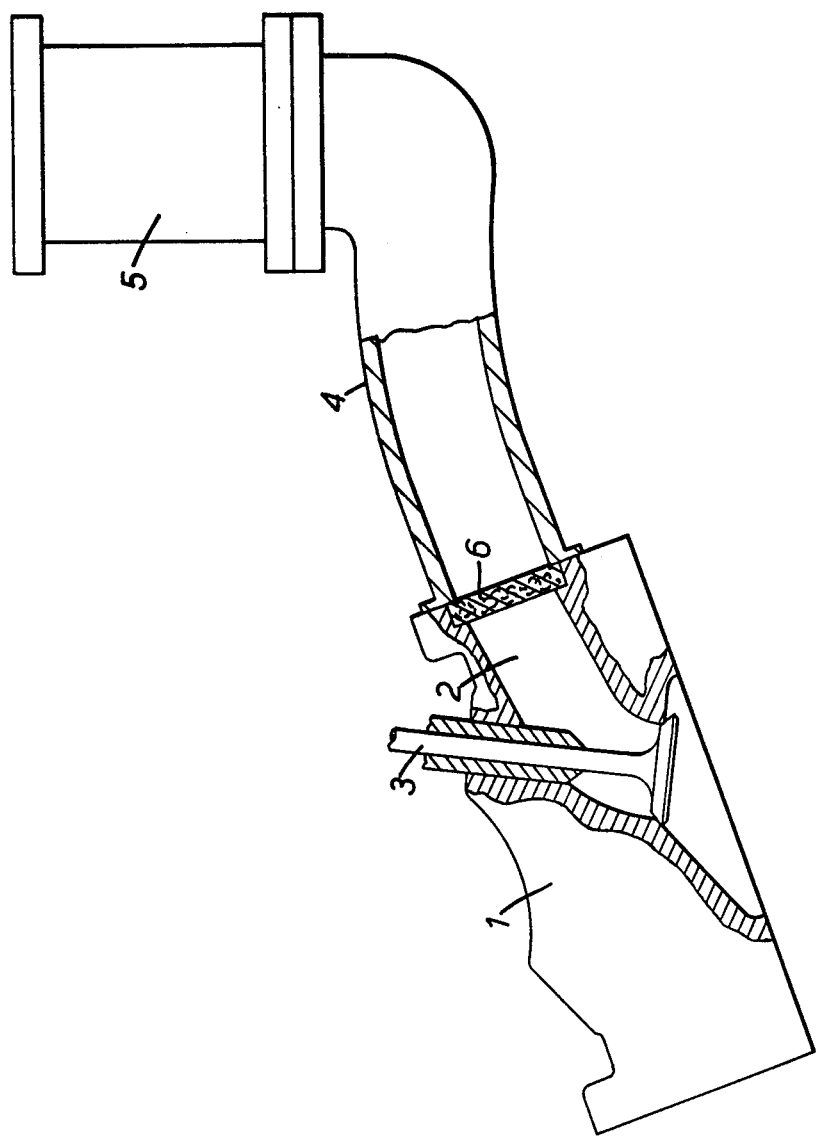

ATOMIZING DEVICE

BACKGROUND OF THE INVENTION

1. Field of the Invention

This invention relates to an atomising device.

2. Description of the Prior Art

A conventional multi-cylinder, petrol, internal combustion engine has a cylinder head with a row of inlet ports at one side. The inlet ports are connected to an inlet manifold leading from a carburettor to the inlet ports. The carburettor atomises the petrol fuel and thus produces a mixture of air and petrol particles which is conducted by the inlet manifold and the inlet ports to the engine cylinders for combustion.

This conventional arrangement has the disadvantage that the petrol particles tend to coalesce as they travel along the manifold and the ports and so enter the cylinders in a condition less suited to efficient combustion than the condition in which they left the carburettor.

SUMMARY OF THE INVENTION

According to the present invention, there is provided an atomizing device comprising a permeable member which is comprised of a porous substance.

This atomising device has the advantage that it can be arranged downstream of the carburettor in a conventional, petrol, internal-combustion engine in order to re-atomize the petrol particles in the mixture of air and petrol particles, so that the size of the petrol particles entering the cylinder is more suited to efficient combustion.

BRIEF DESCRIPTION OF THE DRAWING

In order that the invention may be clearly understood and readily carried into effect reference will now be made, by way of example, to the accompanying drawing, which diagrammatically illustrates parts of an internal combustion apparatus.

DESCRIPTION OF THE PREFERRED EMBODIMENT

Referring to the drawing, a petrol, internal combustion engine has a cylinder head 1 with a row of inlet ports at one side, one of the ports being seen and referenced 2. Associated with the inlet ports are respective inlet valves mounted in the cylinder head, one of the valves being seen and referenced 3. The inlet ports are connected to an inlet manifold 4 leading from a carburettor 5 to the inlet ports. As will be appreciated, this arrangement is conventional, the carburettor atomising the petrol, and the inlet manifold and ports conducting the mixture of air and petrol particles produced by the carburettor to the cylinders of the engine for combustion. However, this conventional arrangement has the disadvantage that the petrol particles tend to coalesce as they travel along the manifold and the ports, and so enter the cylinders in a condition less suited to efficient combustion than the condition in which they left the carburettor. To overcome this disadvantage of the conventional arrangement, the apparatus shown has interposed in the inlet duct system disintegrators disposed at the transitions between the manifold 4 and the inlet ports. There is one disintegrator for each inlet port, that for the port 2 being referenced 6. The disintegrators serve to re-atomise the petrol particles passing through them en route to the cylinders. The nearer the disintegrators to the cylinders, the more effective the disintegrators become, and they are therefore placed as near to the cylinders as is practicable.

Each disintegrator is disposed nearer to its cylinder than to the carburettor 5, and presents to the approaching mixture an exposed area which closes the inlet port but is covered with sharp-edged small holes which extend through the disintegrator. The proportion of hole area to total exposed area of the disintegrator is at least 80%. It needs to be relatively rigid in order to withstand the heavy fluctuating pressure pulses which occur in the inlet duct system. The disintegrator consists of a circular disc of a thickness of between 0.08 and 1.00 inch. It is comprised of a porous substance, the number of pores per linear inch being between 10 and 80, preferably between 15 and 45. The porous substance is a porous metal, preferably a foamed metal. The foamed metal can consist of nickel-chrome alloy or nickel. Such foamed metal can be made by plating a foamed plastics with the metal and then removing the plastics by heating in a vacuum furnace.

In a particular experimental example, I used as the disintegrators circular discs made by plating a reticulated polyurethane foam with nickel-chrome alloy and then removing the polyurethane by heating in a vacuum furnace. The foamed metal had between 15 and 25 pores per linear inch (I found about 20 pores per linear inch to be especially suitable). Each disc was arranged in the position shown in the drawings and I experimented with various disc thicknesses of between 0.08 and 0.50 inch, all of which proved relatively successful. The thickness of the disc of course determines to some extent the strength of the disc and thus its working life under the pulsating pressure and varying temperature conditions which obtained.

The permeable member could be in a form other than that of a circular disc, for example could be a cone, or a cylinder closed at one end.

I claim:

1. An atomizing device with improved mechanical strength comprising a permeable member which is between substantially 0.08 and substantially 0.50 inch thick and which is comprised of a porous substance, the number of pores in said substance per linear inch being between substantially 10 and substantially 80, portions of the permeable member being integral while being permeable due to the pores in said substance for providing increased resistance to pulsating forces said permeable member is a foamed metal.

2. A device according to claim 1, wherein the number of pores per linear inch is between 15 and 45.

3. A device according to claim 2, wherein the number of pores per linear inch is between 15 and 25.

4. A device according to claim 1, wherein said foamed metal is one of nickel-chrome alloy and nickel.

5. Combustion apparatus, comprising mixture-producing means for producing a mixture of combustion-supporting gas and liquid fuel particles, means defining a combustion space wherein the fuel is burned in the presence of the gas, duct means extending from said mixture-producing means to said combustion space for leading said mixture from said mixture-producing means to said combustion space, and a permeable, disintegrating member comprised of a porous substance and disposed at said duct means at a location intermediate said mixture-producing means and said combustion space to avoid exposure to high temperatures in the combustion space and serving to disintegrate liquid fuel particles in the mixture traversing said disintegrating member, said location being nearer to said combustion space than to said mixture-producing means, said disintegrating member being between substantially 0.08 and substantially 0.050 inch thick, and the number of pores per linear inch of said porous substance being between substantially ten and substantially eighty, said permeable member is a foamed metal.

6. Apparatus according to claim 5, wherein said mixture-producing means is a carburettor, and said means defining a combustion space is a cylinder of a petrol, internal combustion engine.

7. Apparatus according to claim 6, wherein said means defining a combustion space includes a cylinder head of said engine, and said location is disposed in the region of an external surface of said cylinder head.

* * * * *